C. VICENZI.
AUTOMOBILE SIGNAL.
APPLICATION FILED JUNE 7, 1919.

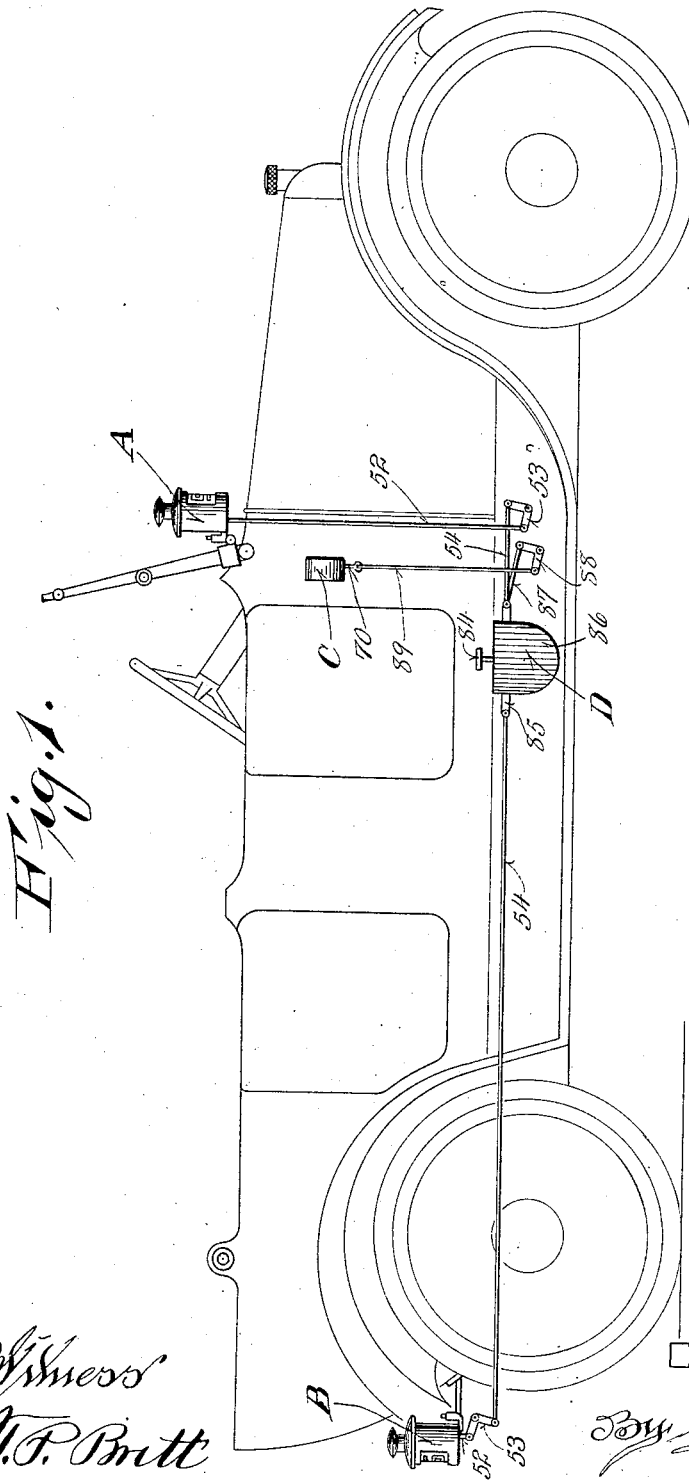

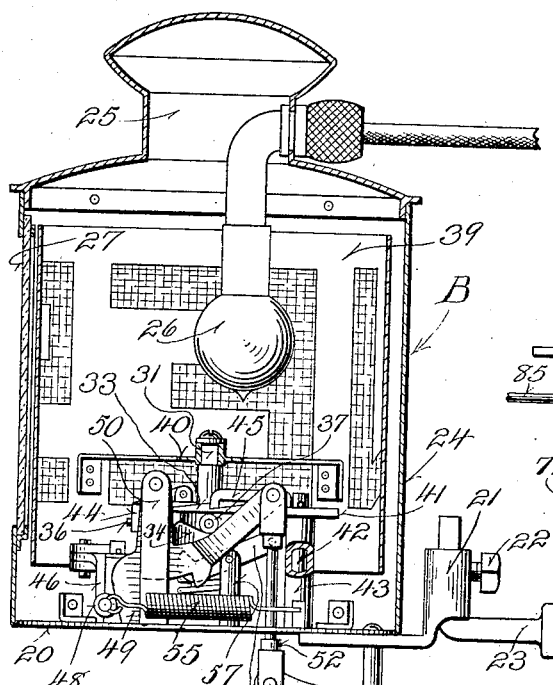

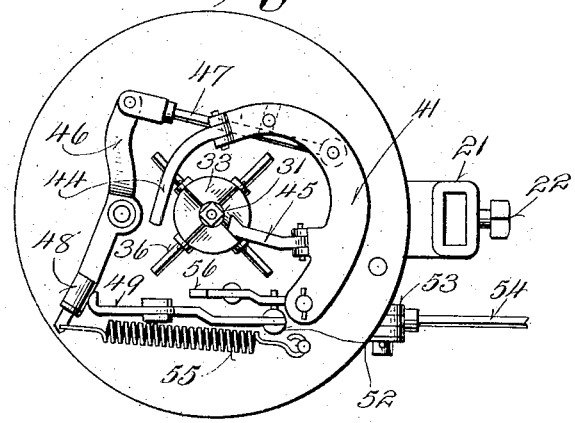
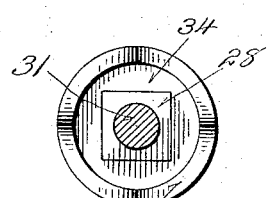
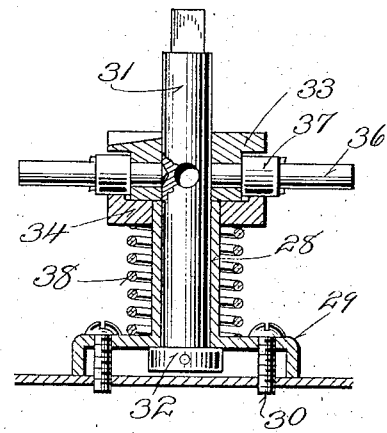
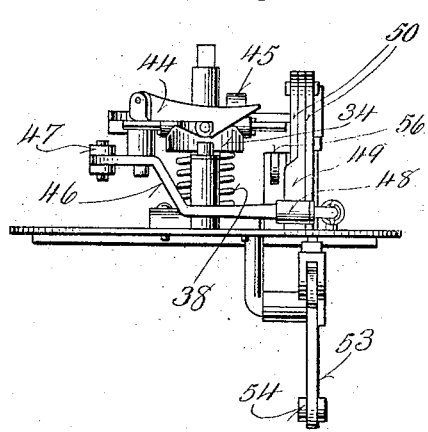

1,331,171.  Patented Feb. 17, 1920.
4 SHEETS—SHEET 4.

Witnesses
J. F. Britt

Inventor
Cesare Vicenzi
By Young & Young
Attorneys

UNITED STATES PATENT OFFICE.

CESARE VICENZI, OF MILWAUKEE, WISCONSIN.

AUTOMOBILE-SIGNAL.

1,331,171.  Specification of Letters Patent.  Patented Feb. 17, 1920.

Application filed June 7, 1919. Serial No. 302,460.

*To all whom it may concern:*

Be it known that I, CESARE VICENZI, a citizen of Austria, and resident of Milwaukee, in the county of Milwaukee and State of Wisconsin, have invented certain new and useful Improvements in Automobile - Signals; and I do hereby declare that the following is a full, clear, and exact description thereof.

My invention relates to new and useful improvements in automobile direction indicators, more particularly of that type including symbol mechanism contained within a suitable casing and operable to display symbols showing the cardinal points of the compass to which it is desired to steer the vehicle.

It is in general the object of my invention to improve the construction and increase the efficiency and reliability of operation of devices of this character, with particular cognizance of the jars and stresses to which devices of this character would be subjected in their use on automobiles. An important object in this connection resides in the provision of means for halting and maintaining the mechanism in its various step positions for properly displaying the symbols, and for insuring full step actuation of the mechanism upon a possible partial actuation of its primary actuator.

A further object resides in the provision of a step actuating mechanism which may be arranged within a signal casing in a most compact manner whereby a minimum size of the casing may be provided consistent with the desired prominence and expanse of the displayed symbol element. A further object in this connection resides in the provision of an arrangement including actuating lever mechanism wherein spring means is provided for completing step shifting movement instituted by the lever mechanism to thus provide for actuation of the step mechanism by a minimum degree of movement of the lever mechanism, the spring means being energized incidental to and by such minimum step movement of the lever mechanism.

With the above and other objects and advantages in view, which will be apparent as the description proceeds, my invention resides in the novel features of construction, combination and arrangement of parts, which will be hereinafter more particularly described and defined by the appended claims.

In the accompanying drawings:

Figure 1 is a conventional side elevational view of an automobile showing my improved direction indicating mechanism associated therewith.

Fig. 2 is a vertical sectional view through one of the main signal casings, showing the step mechanism thereof in elevation.

Fig. 3 is a transverse sectional view through the casing.

Fig. 4 is a detail sectional view of a stop member for limiting the step movements.

Fig. 5 is a plan view of the step mechanism having its parts in an intermediate step position.

Fig. 6 is an elevational view of the step mechanism looking at a different side therefrom from that shown in Fig. 2.

Fig. 7 is a detail vertical sectional view through the spring mechanism for completing the step movement.

Fig. 8 is a plan view of the cam for completing the step movement and maintaining the signal member in its step positions.

Fig. 9 is a detail view of the primary actuating mechanism.

Figure 10:
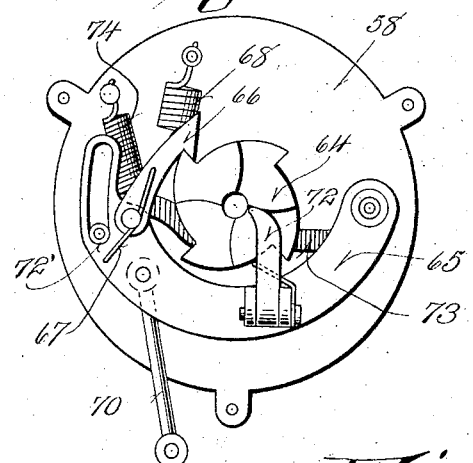
Fig. 10 is an elevational view of a step mechanism for actuating a telltale indicator.

Referring now more particularly to the accompanying drawings, my improved direction indicator preferably comprises a front indicator mechanism A, mounted preferably on the windshield support, a rear indicator mechanism B, mounted at the lower rear portion of the automobile, a telltale indicator C mounted preferably on or adjacent the dashboard and a primary actuator mechanism D mounted in a convenient position for operation by the driver's foot.

As the main signal mechanisms are identical in nature, except that one displays its symbols forwardly and the other displays its symbols rearwardly, but a single mechanism will be specifically shown and described. Each mechanism comprises a base plate 20 carried by a bracket sleeve 21 at one side thereof which is adapted to be secured by a set screw 22 on a bracket arm 23 mounted at any suitable portion of the vehicle, this bracket arm being of any desired nature and being adjustable if desired. The base plate carries an upstanding cylindrical casing 24 having a preferably dome-shaped top 25 from which depends a lamp 26 affording illumination when desired, the casing being provided in one side wall with a sight window 27 extending through the major portion of its height. An upstanding sleeve 28 is mounted centrally on the base plate 20, the bottom of the sleeve being spaced from the plate by the downturned edges of an attaching flange 29 carried by its lower end and secured to the base plate by screws 30. A shaft 31 is journaled in this sleeve, being held against upward displacement by a head 32 under the sleeve, and a ratchet member 33 is fixed on the shaft at the upper end of the sleeve. A disk 34 is slidably mounted on the sleeve, being held against rotation preferably by squaring the outer surface of the sleeve as shown particularly in Fig. 8, and this disk carries an upstanding annular cam flange having series of alternate ridges and depressions corresponding in number to the number of signal elements to be displayed by the mechanism, the signal elements being four in number in the present instance and comprising the cardinal points of the compass. A series of four arms 36 project radially at equal spaced intervals from the ratchet member 33, these arms comprising ratchet projections on the member and the inner portion of each arm carries a roller 37 riding on the cam flange 35 which is resiliently urged upwardly by a spring 38 coiled on the sleeve between the cam disk 34 and attaching flange 29. The symbols of the mechanism are formed in the present instance by translucent portions of a symbol cylinder 39 which is carried by the arms of a spider 40 secured on the squared upper end of the shaft 31. The symbols in the present instance constitute letters representing the cardinal points of the compass, although other symbols such as "Right," "Left," etc., may be provided. The relative positions of the depressions of the cam flange 35 to the window 27 of the signal casing is such that one of the symbols is displayed properly through said window when the rollers 37 of the ratchet member seat in said depressions; and thus means is provided for yieldably holding the symbol cylinder member in its proper step positions. The pitch of the surfaces of the cam flange 35 and the strength of the spring 38 are such that the shaft 31 will be rotated to procure definite step position when the rollers are on the inclines of the cam flange, and this arrangement is utilized for effecting the completion of each step actuation of the mechanism, as will be later explained.

For procuring the step actuations of the mechanism, an arcuate lever 41 is pivoted on a post 42 upstanding from the base plate 20, said lever being maintained in position for horizontal pivotal movement by a sleeve 43 rigid therewith and mounted on the post. This lever extends through approximately half the circumference and partially embracing the ratchet member 33. The lever carries a pivoted hook pawl 44 at its free end adapted to successively engage the ratchet arms 36, and the intermediate portion of the lever carries a pivoted pawl 45 which has its free end resting on the ratchet member 33 and adapted to engage a series of ratchet teeth on the upper face of the member corresponding in number to the number of ratchet arms. A lever 46 is intermediately pivoted on the base plate at its side opposite the pawl lever 41 and this lever is pivotally connected at one end by a link 47 with the pawl lever. The other end of the lever 46 carries an anti-friction roller 48 which is engageable by the enlarged angle portion of an angle lever 49 which has one end pivoted between a pair of upstanding bars 50 on the base plate, said lever 49 carrying a stop which is engageable with the connecting base portion of the bars 50 to limit swinging movement of the lever 49 against the lever 46. The other end of the lever 49 is connected by a link 52 with one end of an angle lever 53 pivoted under the base plate, said angle lever having a depending arm to which is pivoted a rod 54 extending to the primary actuator mechanism D. Various lever structures described are urged to initial offset position by a contractile coil spring 55 secured to the roller end of the lever 48 and to the base plate to urge the roller end of the lever 46 against the lever 49.

Thus upon rocking the lever 53, movement will be transmitted through the train of levers described to the pawl lever 41 to swing the shaft by the engagement of the pawl 44 with one of the ratchet arms 36. It is noted that the arc of swinging movement imparted to the shaft by the pawl 44 is just sufficient to move the ratchet arms past the high points of the cam flange 35 and the completion of the step movement is effected by the action of the cams under influence of the spring 38 which is energized to procure this action by the manual impulse transmitted through the lever train which effects the initial portion of the step operation. A minimum degree of movement of the various lever mechanisms within the signal casing 24 is thus necessary, conducing greatly to a desired compactness of structure, and this compactness of structure is further procured by the disposition of the various lever members about the shaft. The pawl 45 is utilized to procure the first portion of the step movement in the event that, through incomplete actuation of the primary actuator mechanism, the pawl 40 does not swing the shaft and ratchet member a sufficient distance to clear the high points of the cam structure, this pawl acting in the return or resetting movement of the pawl lever 41. A stop pawl 56 is pivoted on a post 57 upstanding from the base plate 20 for stopping spring impelled movement of the shaft and ratchet member at the completion of the step operation. This pawl has a shoulder at one end engageable by the ratchet arms 36 and its other end is in pin and slot connection with the link 52 whereby the stop dog is moved to and from engaging position upon movement of the actuating lever train.

Figure 11:
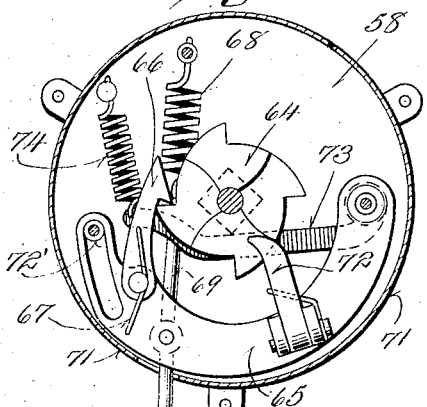
Fig. 11 shows said mechanism with the parts in intermediate position.
Figure 12:
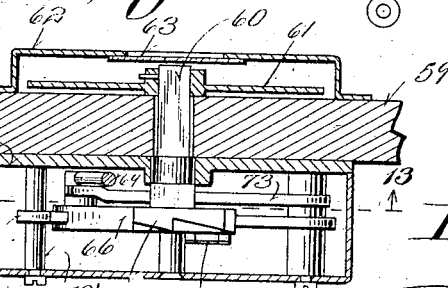
Fig. 12 is a sectional view through the complete telltale indicator.
Figure 13:
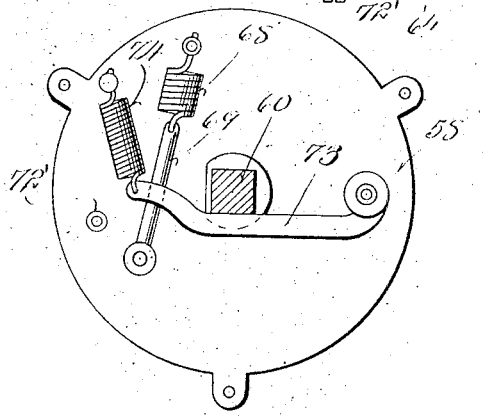
Fig. 13 is a detail sectional view on the line 13—13 of Fig. 12.
Figure 14:
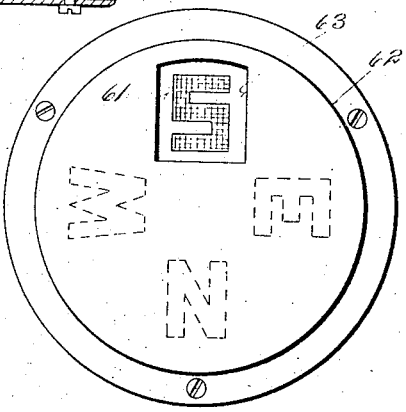
Fig. 14 is an elevational view of the face of the telltale indicator.

The telltale indicator mechanism C, operable in synchronism with the main signal mechanism to show the indications thereof, includes a base plate 58 which is preferably secured, as shown particularly in Fig. 12, to the dash or instrument-board 59 of the automobile. A squared shaft 60 has an intermediate rounded portion journaled in this base plate and extends through the dashboard carrying a dial plate 61 on the exposed face of the dashboard, said dial plate being surrounded by a casing 62 provided with a sight window 63 for selectively displaying the symbols of the dial plate. Inasmuch as the symbol structure of this telltale indicator is lighter than the symbol structure of the main signal mechanism, a simpler operating means may be employed therefor. Thus, a ratchet disk 64 is fixed on the end of the shaft 60 and an arcuate lever 65 is pivoted on the base plate, partially surrounding the ratchet disk. This lever carries at one end a pawl 66 engageable with peripheral teeth on the ratchet disk, the pawl being urged to engagement by a spring 67, while the lever 65 is urged to initial or set position by a contractile coil spring 68 secured to the base plate and to a link 69 which is pivoted to the lever 65. The lever 65 is actuated by a link 70 depending through a casing 71 which surrounds the actuating mechanism. The lever is limited in its rocking movement by a pin 72' extending through a longitudinal slot in the free end portion of the lever, this slot being of course concentric with the pivot axis of the lever. The lever 65 also carries a second pawl 72 pivoted at its intermediate portion and serving, similar to the pawl 45 of the main signal mechanism to move the ratchet member to proper position in the event that the movement of the pawl 66 is insufficient due to incomplete actuation of the primary actuator mechanism D. For holding the shaft 60 in its step positions, a lever 73 is pivoted in the casing preferably co-axially with the lever 65, and this lever 73 is urged to engagement with a squared portion of the shaft by a spring 74 secured to the free end of the lever and to the base plate. In the general manner set forth in connection with the main signal mechanism, the lever 73 serves under influence of the spring 74 to procure the final portion of each step movement, it being noted particularly by reference to Fig. 11 that the pawls of the lever 65 procure the first portion of the step movement to move one of the corners of the squared shaft 60 past dead center engagement with the surface of the lever 73. Substantially the same advantages of compactness are thus incorporated in the telltale indicator mechanism.

The primary actuator mechanism comprises a base plate 75 having a pair of depending arms 76 between which extend bars 77 which mount the intermediate pivots of a pair of levers 78. These levers have their lower ends directed together in lapped relation, with their lapped portions longitudinally slotted for the reception of a pivot pin 79 carried by the bifurcated lower end 80 of a plunger rod 81 which is slidably mounted in the base plate, said bifurcated lower end of the rod embracing the lever ends. The rod is normally urged to raised position by a spring 82 coiled thereon and bearing against the bar 77 and against a collar 83 on the rod. The upper end of the rod carries a foot-piece 84. Depressing movement of the rod by engagement of the operator's foot with said foot-piece 84 thus rocks the upper ends of the levers 78 inwardly. Links 85 are secured to these upper ends of the levers and extend outwardly therefrom longitudinally of the vehicle through a casing 86 which surrounds the levers and rod 81. One of the links 85 is connected with the link 54 extending from the rear main signal member B. The other link 85 is connected with the link 54 of the main signal member A. Said other link 85 is also connected with one end of a link 87 which has its other end connected with an angle lever 88 which is connected in turn by a link 89 with the link 70 of the telltale indicator C. Thus, depression of the foot-piece 84 serves to simultaneously actuate all of the indicator mechanisms.

While I have shown and described a preferred embodiment of my invention, it will be appreciated that various changes and modifications of structure may be employed without departing in any manner from the spirit of my invention.

What is claimed is:

1. In a signal device of the class described, a cylindrical casing provided with a window, a shaft extending axially in the casing, a cylindrical signal member in the casing, a spider member on said shaft connected with the intermediate portion of the signal member, and means surrounding said shaft within the casing and extending into the signal member for imparting step rotations to the shaft and signal member.

2. In a signal device of the class described, a rotatably mounted shaft, a signal member connected with said shaft, and mechanism for procuring step rotations of said shaft including manually operative means for instituting step rotation and spring operated means for completing said step rotation.

3. In a signal device of the class described, a rotatably mounted shaft, a signal member connected with said shaft, and mechanism for procuring step rotations of said shaft including manually operative means for instituting step rotation and spring operated means for completing said step rotation, said spring means being energized upon actuation of said manual means.

4. In a signal device of the class described, a journaled shaft, a signal member connected with said shaft, an arcuate lever pivoted at one end and partially embracing the shaft, a ratchet wheel on the shaft, a pawl on the other end of the lever engageable with said ratchet wheel, a lever pivoted at the side of the shaft opposite said arcuate lever, a link connection between one end of said second lever and the arcuate lever, and means engageable with the other end of said second lever for rocking it.

5. In a signal device of the class described, a rotatably mounted shaft, a signal member connected with said shaft, and means for procuring step rotations of said shaft including an annular series of cam faced portions connected with the shaft and a member resiliently urged against said cam face portions whereby to yieldably halt the shaft in certain rotative positions and to urge said shaft to said positions.

6. In a signal device of the class described, a rotatably mounted shaft, a signal member connected with said shaft, a series of radial arms projecting from the shaft, an annular cam member resiliently urged against said series of arms and provided with alternate ridges and depressions and means for imparting rotative impulses to the shaft.

7. In a signal device of the class described, a rotatably mounted shaft, a signal member connected with said shaft, a series of radial arms projecting from the shaft, a stationary sleeve surrounding the shaft, a cam member slidable on the sleeve and held against rotation with respect thereto, said cam member having alternate ridge and depression portions engageable against the radial arms of the shaft, a spring coiled on the sleeve and urging said cam member to engage the shaft and means for imparting initial rotative impulses to the shaft.

In testimony that I claim the foregoing I have hereunto set my hand at Milwaukee, in the county of Milwaukee, and State of Wisconsin.

CESARE VICENZI.